United States Patent
Maver

(10) Patent No.: US 10,875,664 B1
(45) Date of Patent: Dec. 29, 2020

(54) PROPELLER TIP WARNING MARKER LIGHT

(71) Applicant: Hamilton Sundstrand Corporation, Charlotte, NC (US)

(72) Inventor: Timothy Maver, Glastonbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/457,112

(22) Filed: Jun. 28, 2019

(51) Int. Cl.
| | |
|---|---|
| *B64D 47/06* | (2006.01) |
| *B64C 27/46* | (2006.01) |
| *B64C 27/00* | (2006.01) |
| *F21W 103/10* | (2018.01) |
| *F21S 43/14* | (2018.01) |
| *F21S 9/04* | (2006.01) |
| *F21Y 115/10* | (2016.01) |
| *F21V 33/00* | (2006.01) |

(52) U.S. Cl.
CPC ............ *B64D 47/06* (2013.01); *B64C 27/006* (2013.01); *B64C 27/463* (2013.01); *B64D 2203/00* (2013.01); *F21S 9/04* (2013.01); *F21S 43/14* (2018.01); *F21V 33/0096* (2013.01); *F21W 2103/10* (2018.01); *F21Y 2115/10* (2016.08)

(58) Field of Classification Search
CPC ................................ F21S 43/14; B64D 47/06
See application file for complete search history.

(56) References Cited

U.S. PATENT DOCUMENTS

| | | | | |
|---|---|---|---|---|
| 2,423,528 A | * | 7/1947 | Stewart | B64D 47/06 340/946 |
| 3,710,311 A | * | 1/1973 | Avital | B64D 47/06 340/946 |
| 3,723,722 A | | 3/1973 | Inderstine | |
| 5,793,164 A | * | 8/1998 | Authier | B64D 47/06 315/178 |
| 6,048,172 A | * | 4/2000 | Pniel | B64D 47/06 340/946 |
| 7,324,016 B1 | * | 1/2008 | Milgram | B64C 27/023 244/17.11 |

(Continued)

FOREIGN PATENT DOCUMENTS

| | | |
|---|---|---|
| EP | 3205583 A1 | 8/2017 |
| EP | 3248867 A1 | 11/2017 |

(Continued)

OTHER PUBLICATIONS

Anonymous, "Hands-on Activity: Building a Piezoelectric Generator", Online Retrieved 2019, URL:<https://www.teachengineering.org/activities/view/uoh_piezo_lesson01_activity1>, 9 pages.

(Continued)

*Primary Examiner* — Zheng Song
(74) *Attorney, Agent, or Firm* — Cantor Colburn LLP

(57) ABSTRACT

An aerodynamic blade is provided and includes a blade body and a light module. The blade body includes an inboard end and a tip outboard of the inboard end. The blade body is connectable with a hub at the inboard end such that rotations of the hub drive rotations of the tip about a rotational axis. The light module is disposed in the tip and configured to activate in response to the rotations of the tip about the rotational axis to emit light visible at an exterior of the blade body.

16 Claims, 3 Drawing Sheets

(56) References Cited

U.S. PATENT DOCUMENTS

| | | |
|---|---|---|
| 7,854,590 B2 | 12/2010 | Landry |
| 10,053,214 B2 | 8/2018 | Schoen et al. |
| 2006/0051207 A1 | 3/2006 | Becerra et al. |
| 2014/0268648 A1* | 9/2014 | Gomes .................. F25D 27/005 |
| | | 362/94 |
| 2016/0362193 A1 | 12/2016 | Bemis |
| 2017/0237369 A1* | 8/2017 | Becker .................. B64D 47/02 |
| | | 416/5 |
| 2018/0156394 A1* | 6/2018 | Hsia .................. H05B 37/0227 |

FOREIGN PATENT DOCUMENTS

| | | |
|---|---|---|
| KR | 101637390 B1 | 7/2016 |
| WO | 03011689 A1 | 2/2003 |
| WO | 2008111932 A1 | 9/2008 |

OTHER PUBLICATIONS

European Search Report Application No. EP19216019; dated Jul. 27, 2020; pp. 24.

* cited by examiner

PROPELLER TIP WARNING MARKER LIGHT

BACKGROUND

The following description relates to warning lights and, more specifically, to propeller tip warning marker lights.

For propeller driven aircraft, propeller blade tips travel at a high velocity and can pose a danger to ground personnel and deplaning passengers in the vicinity who might accidentally walk into a plane of rotation of a propeller blade. It is, therefore, required that propeller blade tips include paint to highlight the end of the rotating blade. This paint is not always observed, however, so it does not always result in propeller blade visibility and safety.

BRIEF DESCRIPTION

According to an aspect of the disclosure, an aerodynamic blade is provided and includes a blade body and a light module. The blade body includes an inboard end and a tip outboard of the inboard end. The blade body is connectable with a hub at the inboard end such that rotations of the hub drive rotations of the tip about a rotational axis. The light module is disposed in the tip and configured to activate in response to the rotations of the tip about the rotational axis to emit light visible at an exterior of the blade body.

In accordance with additional or alternative embodiments, the blade body has an airfoil shape configured for operation with one or more of a rotor, a propeller and a fan and the tip of the blade body includes inboard and outboard blade structures, the inboard blade structure having an outboard side adjacent to the light module, a securing feature interposed between the light module and the outboard blade structure and sheaths partially covering upper and lower surfaces of the inboard and outboard blade structures, the light module and the securing feature. The sheaths define slots and the light module includes lenses protruding through the slots.

In accordance with additional or alternative embodiments, the light module includes a light emitting diode (LED) and a voltage source to generate electricity for powering the LED.

In accordance with additional or alternative embodiments, the voltage source includes an external circuit or is localized in the light module.

In accordance with additional or alternative embodiments, the voltage source includes a piezoelectric element to generate electricity in response to the rotations of the tip about the rotational axis.

In accordance with additional or alternative embodiments, the light module further includes a filtering element to filter and store the electricity generated by the voltage source and a control circuit configured to supply the electricity from the filtering element to the LED in accordance with predefined conditions being in effect.

In accordance with additional or alternative embodiments, the LED includes one or more of a strobe LED, a variable color LED and a pattern forming LED and the control circuit is further configured to control operations of the one or more of the strobe LED, the variable color LED and the pattern forming LED in accordance with additional predefined conditions being in effect.

According to another aspect of the disclosure, a rotary aircraft is provided and includes an airframe, a rotatable shaft and a rotor. The rotor includes multiple aerodynamic blades and is drivable to rotate about a rotational axis by the rotatable shaft to generate one or more of lift and propulsion for the airframe. Each of the multiple aerodynamic blades includes a blade body and a light module. The blade body includes an inboard end and a tip outboard of the inboard end such that rotations of the rotor drive rotations of the tip about the rotational axis. The light module is disposed in the tip and is configured to activate in response to the rotations of the tip about the rotational axis to emit light visible at an exterior of the blade body.

In accordance with additional or alternative embodiments, the blade body has an airfoil shape and the tip of the blade body includes inboard and outboard blade structures, the inboard blade structure having an outboard side adjacent to the light module, a securing feature interposed between the light module and the outboard blade structure and sheaths partially covering upper and lower surfaces of the inboard and outboard blade structures, the light module and the securing feature. The sheaths define slots and the light module includes lenses protruding through the slots.

In accordance with additional or alternative embodiments, the light module includes a light emitting diode (LED) and a voltage source to generate electricity for powering the LED.

In accordance with additional or alternative embodiments, the voltage source includes an external circuit or is localized in the light module.

In accordance with additional or alternative embodiments, the voltage source includes a piezoelectric element to generate electricity in response to the rotations of the tip about the rotational axis.

In accordance with additional or alternative embodiments, the light module further includes a filtering element to filter and store the electricity generated by the voltage source and a control circuit configured to supply the electricity from the filtering element to the LED in accordance with predefined conditions being in effect.

In accordance with additional or alternative embodiments, the LED includes one or more of a strobe LED, a variable color LED and a pattern forming LED and the control circuit is further configured to control operations of the one or more of the strobe LED, the variable color LED and the pattern forming LED in accordance with additional predefined conditions being in effect.

According to another aspect of the disclosure, a tip of a blade body of an aerodynamic blade is provided. The tip is rotatable about a rotational axis and includes a light module configured to activate in response to rotations of the tip about the rotational axis to emit light visible at an exterior of the blade body, inboard and outboard blade structures, the inboard blade structure having an outboard side adjacent to the light module, a securing feature interposed between the light module and the outboard blade structure and sheaths partially covering upper and lower surfaces of the inboard and outboard blade structures, the light module and the securing feature. The sheaths define slots and the light module includes lenses protruding through the slots.

In accordance with additional or alternative embodiments, the light module includes a light emitting diode (LED) and a voltage source to generate electricity for powering the LED.

In accordance with additional or alternative embodiments, the voltage source includes an external circuit or is localized in the light module.

In accordance with additional or alternative embodiments, the voltage source includes a piezoelectric element to generate electricity in response to the rotations of the tip about the rotational axis.

In accordance with additional or alternative embodiments, the light module further includes a filtering element to filter and store the electricity generated by the voltage source and a control circuit configured to supply the electricity from the filtering element to the LED in accordance with predefined conditions being in effect.

In accordance with additional or alternative embodiments, the LED includes one or more of a strobe LED, a variable color LED and a pattern forming LED and the control circuit is further configured to control operations of the one or more of the strobe LED, the variable color LED and the pattern forming LED in accordance with additional predefined conditions being in effect.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a propeller blade is provided and includes a small and lightweight light emitting diode (LED) and power device, such as a piezoelectric power device, incorporated near the blade tip. The propeller blade thus includes a self-powered device that will provide suitable warning and visibility to ground personnel and passengers in both daytime and nighttime conditions.

Figure 1:
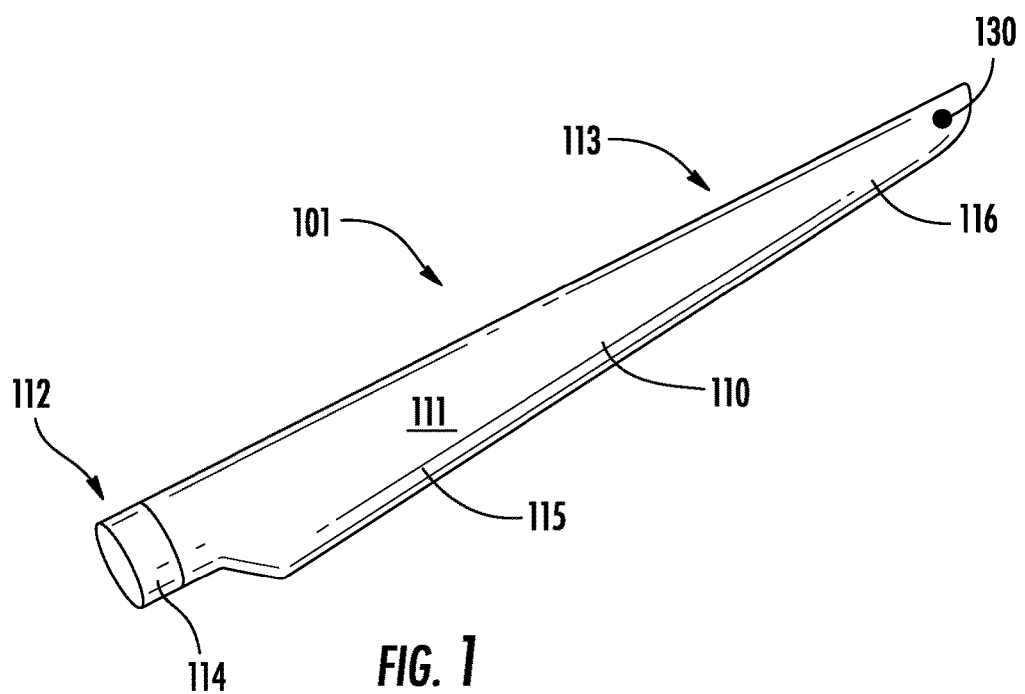
FIG. 1 is a perspective view of an aerodynamic blade in accordance with embodiments.
Figure 2:
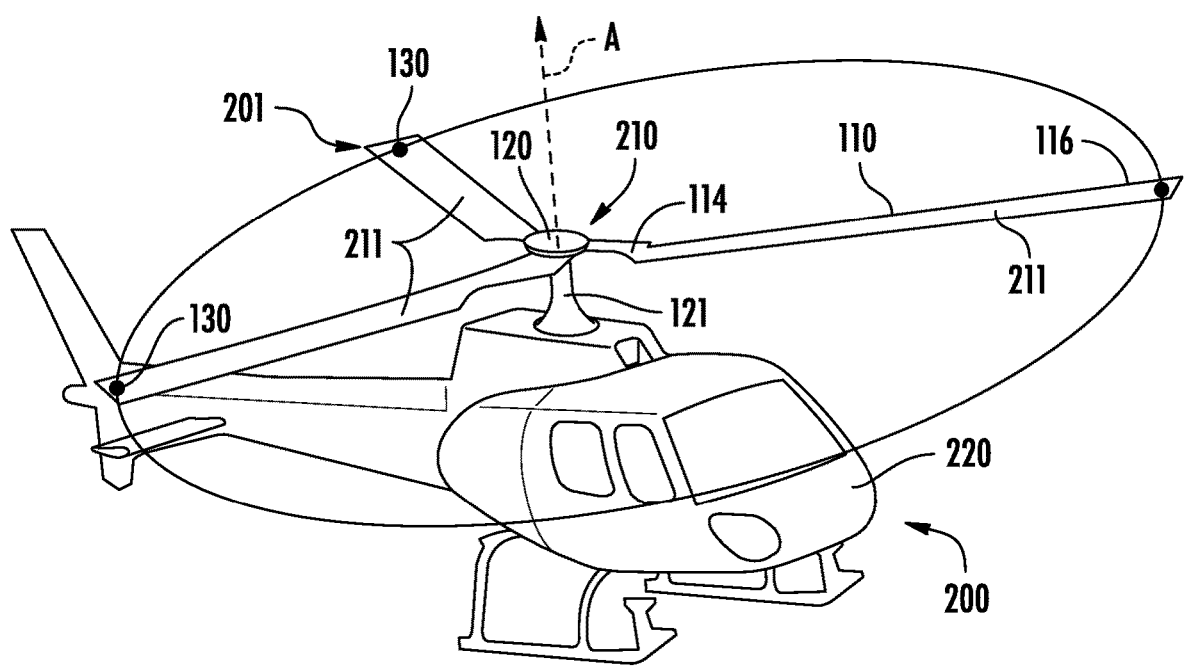
FIG. 2 is a perspective view of a rotary aircraft in accordance with embodiments.
Figure 3:
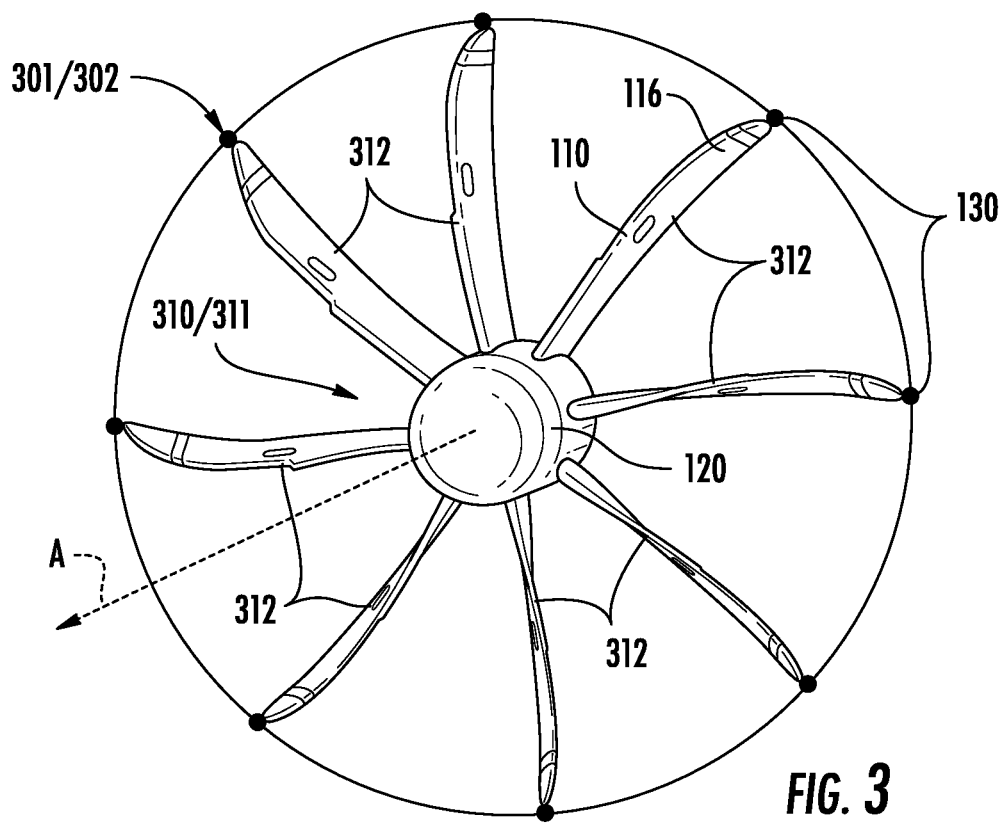
FIG. 3 is a perspective view of a turbofan or propfan in accordance with embodiments.

With reference to FIGS. 1-3, an aerodynamic blade 101 is provided and includes a blade body 110 and a light module 130. The blade body 110 has an airfoil shape 111 that is configured for operation with one or more of a rotor 201, such as a helicopter rotor 210 (see FIG. 2), a propeller 301 or a fan 302, such as a turbofan 310 or a propfan 311 (see FIG. 3), freely rotating equipment, etc. As such, as shown in FIG. 1, the blade body 110 includes an inboard end 112 and an outboard end 113. The inboard end 112 includes a root section 114. The outboard end 113 is outboard of the inboard end 112 and includes an airfoil section 115. The airfoil section 115 includes a pressure surface, a suction surface opposite the pressure surface and leading and trailing edges extending along leading and trailing sides of the pressure and suction surfaces. At a distal end of the airfoil section 115 of the blade body 110, the blade body 110 includes a tip 116 which is outboard of the inboard end 112 and a substantial portion of the outboard end 113.

As in the case of the rotor 201 of the helicopter rotor 210 of FIG. 2 and the propeller 301 or the fan 302 of the turbofan 310 or the propfan 311 of FIG. 3, the blade body 110 is connectable with a hub 120 (and a rotatable shaft 121 as shown in FIG. 2) at the root section 114 of the inboard end 112. As such, rotations of the hub 120 (and the rotatable shaft 121) drive rotations of the tip 116 about a rotational axis A. The light module 130 is disposed in the tip 116 of the blade body 110. The light module 130 is configured to activate in response to the rotations of the tip 116 about the rotational axis A to emit light visible (i.e., to an observer) at an exterior of the blade body 110.

In an exemplary case of the blade body 110 having the airfoil shape 111 configured for operation with the rotor 201 of the helicopter rotor 210 of FIG. 2, the helicopter rotor 210 can be a component of rotary aircraft 200. Here, the rotary aircraft 200 can include an airframe 220, the hub 120, the rotatable shaft 121 and the helicopter rotor 210. With continued reference to FIG. 1 and, as shown in FIG. 2, the helicopter rotor 210 includes multiple aerodynamic blades 211 and is drivable to rotate about the rotational axis A by the rotatable shaft 121 and the hub 120 to generate one or more of lift and propulsion for the airframe 220. Each of the multiple aerodynamic blades 211 is configured like the aerodynamic blade 101 described above and includes the blade body 110 and the light module 130.

Thus, when the helicopter rotor 210 is driven to rotate, the light module 130 in each of the aerodynamic blades 211 becomes activated and emits light that is visible to an observer, such as the pilot/copilot, passengers and ground personnel. This light increases the visibility of the aerodynamic blades 211 and decreases a likelihood of the aerodynamic blades 211 coming into contact with anything or anyone and similarly decreases a likelihood of anything or anyone coming into contact with the aerodynamic blades 211. Notably, at sufficiently high RPMs, the light emitted by the light module 130 of each of the aerodynamic blades 211 would appear to the observer as a circular light, although it is to be understood that other lighting embodiments exist as will be discussed below.

In an exemplary case of the blade body 110 having the airfoil shape 111 configured for operation with the propeller 301 or the fan 302 of the turbofan 310 or the propfan 311 of FIG. 3, the turbofan 310 or the propfan 311 can be a component of a vehicle or another piece of equipment. In any case, with continued reference to FIG. 1 and, as shown in FIG. 3, the turbofan 310 or the propfan 311 includes multiple aerodynamic blades 312 and is drivable to rotate about the rotational axis A by the rotatable shaft 121 and the hub 120. Each of the multiple aerodynamic blades 312 is configured like the aerodynamic blade 101 described above and includes the blade body 110 and the light module 130. Thus, when the turbofan 310 or the propfan 311 is driven to rotate, the light module 130 in each of the aerodynamic blades 312 becomes activated and emits light that is visible to an observer. This light increases the visibility of the aerodynamic blades 312 and decreases a likelihood of the aerodynamic blades 312 coming into contact with anything or anyone and similarly decreases a likelihood of anything or anyone coming into contact with the aerodynamic blades 312. Notably, at sufficiently high RPMs, the light emitted by the light module 130 of each of the aerodynamic blades 312 would appear to the observer as a circular light, although it is to be understood that other lighting embodiments exist as will be discussed below.

Figure 4:
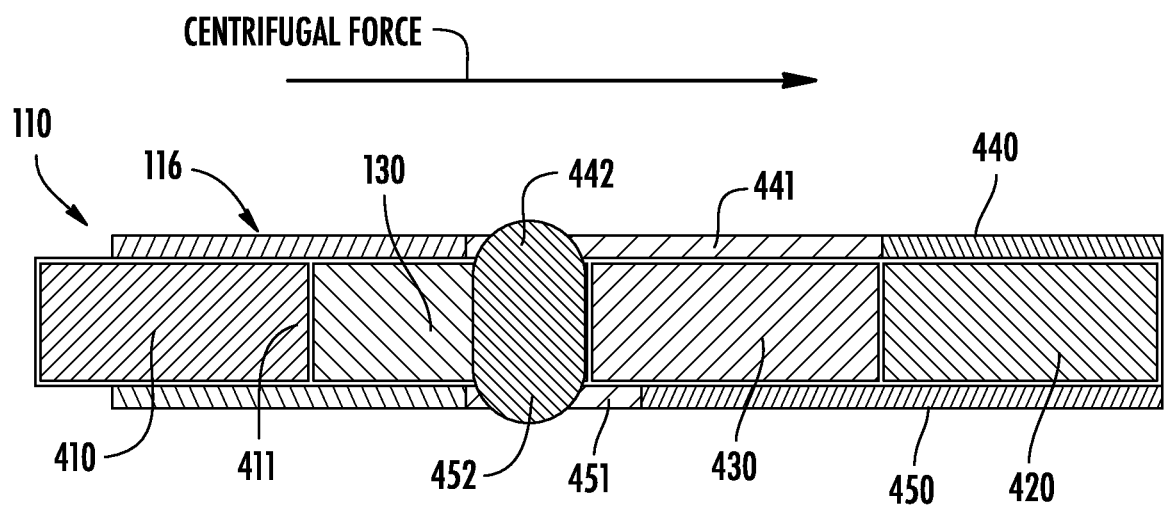
FIG. 4 is a schematic diagram of a blade body including a light module in accordance with embodiments.

With continued reference to FIG. 1 and with additional reference to FIG. 4, the tip 116 of the blade body 110 includes an inboard blade structure 410, an outboard blade structure 420, a securing feature 430, an upper sheath 440 and a lower sheath 450. The inboard blade structure 410 has an outboard side 411 that is disposable adjacent to the light module 130 and the securing feature 430 is interposed between the light module 130 and the outboard blade structure 420. With this configuration, as the tip 116 of the blade body 110 rotates about the rotational axis A (see FIGS. 2 and 3), centrifugal force and other vibrational and oscillatory effects act on each of the components in the direction identified by the arrow of FIG. 4. These can, in some cases, be used directly or indirectly in the generation of electricity for powering the light module 130. The securing feature 430 is configured to constrain movement of the light module 130. The upper and lower sheaths 440 and 450 can be configured for erosion protection and partially cover upper and lower surfaces of each of the inboard and outboard blade structures 410 and 420, the light module 130 and the securing feature 430.

In accordance with embodiments, the upper and lower sheaths 440 and 450 can be formed to define slots 441 and 451, respectively. The slots 441 and 451 allow for the installation of the light module 130 and the securing feature 430. In these or other cases, the light module 130 can include lens elements 442 and 452. These lens elements 442 and 452 can be provided with slight convex curvatures whereby portions of the lens elements 442 and 452 protrude through the slots 441 and 451, respectively. The convexity of the lens elements 442 and 452 can increase a visibility of the light emitted by the light module 130. In addition, since the convexity of the lens elements 442 and 452 can be limited without sacrificing visibility, disruption of airflows over the tip 116 of the blade body 110 can be insignificant.

Figure 5:
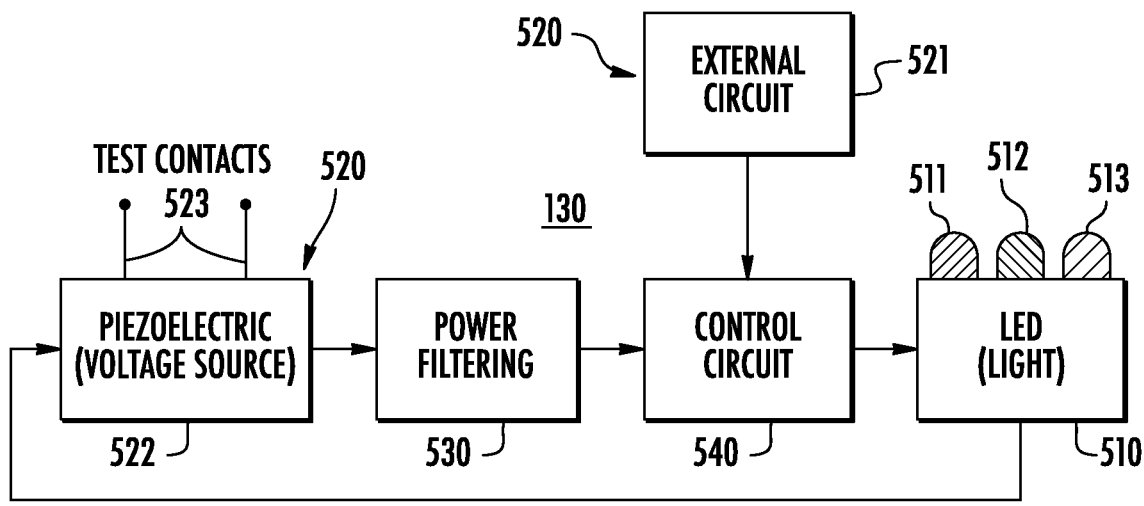
FIG. 5 is a schematic diagram of a light module for use in the blade body of FIG. 4 in accordance with embodiments.

With reference to FIG. 5, the light module 130 includes a light emitting diode (LED) 510 and a voltage source 520 to generate electricity for powering the LED 510. The voltage source 520 can include or be provided as an external circuit 521, such as a de-icing circuit, or can be localized in the light module 130. In the latter case, the voltage source 520 can include or be provided as a piezoelectric element 522. Here, as the tip 116 of the blade body 110 rotates about the rotational axis as described above and the centrifugal force and the other vibrational and oscillatory effects are applied to the light module 130, the piezoelectric element 522 generates electricity. In particular, the piezoelectric element 522 can use vibration and pressure oscillations resulting from the rotations that result in strain changes experienced by the piezoelectric element 522.

The voltage source 520 can further include electrical contacts 523 to allow for non-rotating testing of the various circuits of the light module 130. Applicants of voltage and measurements of electrical characteristics of the various circuits of the light module can provide necessary information regarding health status of the light module 130.

Figure 6:
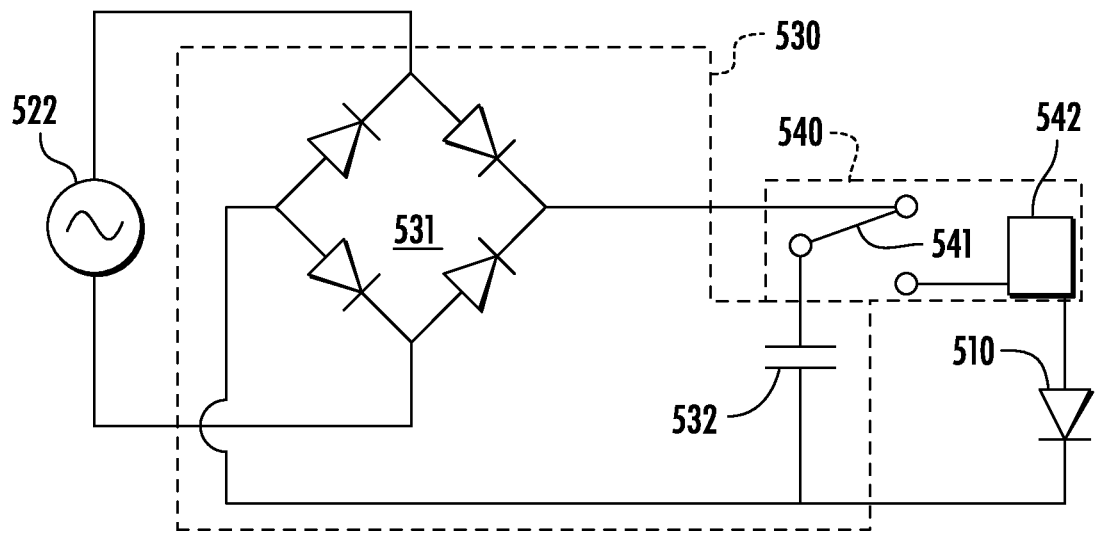
FIG. 6 is a circuit diagram illustrating circuit components of the light module of FIG. 5 in accordance with embodiments.

With continued reference to FIG. 5 and with additional reference to FIG. 6 and, in accordance with embodiments, the light module 130 can further include a filtering element 530 to filter and store the electricity generated by the voltage source 520 and a control circuit 540 that is configured to supply the electricity from the filtering element 530 to the LED 510 in accordance with predefined conditions (i.e., when sufficient or a predefined amount of electricity is stored) being in effect. As shown in FIG. 6, the filtering element 530 can include a diode rectifier 531 and a capacitor 532 or other suitable storage device whereby the filtering element 530 smooths the electricity generated by the voltage source 520 (particularly where the voltage source 520 is the piezoelectric element 522). The control circuit 540 can be designed as a passive voltage monitoring features and can include a switch 541 that couples the LED 510 to the filtering element 530 such that the LED 510 can be powered when a predefined or sufficient amount of electricity is stored in the capacitor 532. The control circuit 540 can further include control logic 542 that can allow for discrete timing of activation of the switch 541.

In accordance with further embodiments, the LED 510 can include or be provided as one or more of a strobe LED 511, a variable color LED 512 and a pattern forming LED 513 (see FIG. 5). In these or other cases, the control logic 542 of the control circuit 540 can be further configured to control operations of the one or more of the strobe LED 511 to create a strobing light effect during operations of the light module 130, the variable color LED 512 to assign various colors to rotational speeds of the tip 116 of the blade body 110 and the pattern forming LED 513 to create a lighting pattern during operations of the light module 130. The control logic 542 can execute such control in accordance with additional predefined conditions being in effect such as when the tip 116 of the blade body 110 rotates at various rotational speeds, when the tip 116 rotates near an object or when personnel are nearby.

Technical effects and benefits of the enclosure design of the present disclosure are the provision of a small and lightweight light emitting diode (LED) and power device, such as a piezoelectric power device, incorporated near a blade tip of a rotating blade. The blade thus includes a self-powered device that will provide suitable warning and visibility in various conditions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An aerodynamic blade, comprising:
    a blade body comprising an inboard end and a tip outboard of the inboard end, the blade body being connectable with a hub at the inboard end such that rotations of the hub drive rotations of the tip about a rotational axis; and
    a light module disposed in the tip and configured to activate in response to the rotations of the tip about the rotational axis to emit light visible at an exterior of the blade body, wherein the blade body has an airfoil shape configured for operation with one or more of a rotor, a propeller and a fan and the tip of the blade body comprises:
    inboard and outboard blade structures, the inboard blade structure having an outboard side adjacent to the light module;

a securing feature interposed between the light module and the outboard blade structure; and sheaths partially covering upper and lower surfaces of the inboard and outboard blade structures, the light module and the securing feature, the sheaths defining slots and the light module comprising lenses protruding through the slots.

2. The aerodynamic blade according to claim 1, wherein the light module comprises a light emitting diode (LED) and the aerodynamic blade further comprises a voltage source that is configured to generate electricity for powering the LED.

3. The aerodynamic blade according to claim 2, wherein the light module further comprises:

a filtering element to filter and store the electricity generated by the voltage source; and a control circuit configured to supply the electricity from the filtering element to the LED in accordance with predefined conditions being in effect.

4. The aerodynamic blade according to claim 3, wherein:

the LED comprises one or more of a strobe LED, a variable color LED and a pattern forming LED, and the control circuit is further configured to control operations of the one or more of the strobe LED, the variable color LED and the pattern forming LED in accordance with additional predefined conditions being in effect.

5. The aerodynamic blade according to claim 2, wherein the voltage source comprises a piezoelectric element to generate electricity in response to the rotations of the tip about the rotational axis.

6. A rotary aircraft, comprising:

an airframe;

a rotatable shaft; and a rotor comprising multiple aerodynamic blades, which is drivable to rotate about a rotational axis by the rotatable shaft to generate one or more of lift and propulsion for the airframe, each of the multiple aerodynamic blades comprising:

a blade body comprising an inboard end and a tip outboard of the inboard end such that rotations of the rotor drive rotations of the tip about the rotational axis; and a light module disposed in the tip and configured to activate in response to the rotations of the tip about the rotational axis to emit light visible at an exterior of the blade body, wherein the blade body has an airfoil shape and the tip of the blade body comprises:

inboard and outboard blade structures, the inboard blade structure having an outboard side adjacent to the light module;

a securing feature interposed between the light module and the outboard blade structure; and sheaths partially covering upper and lower surfaces of the inboard and outboard blade structures, the light module and the securing feature, the sheaths defining slots and the light module comprising lenses protruding through the slots.

7. The rotary aircraft according to claim 6, wherein the light module comprises a light emitting diode (LED) and each of the multiple aerodynamic blades further comprises a voltage source that is configured to generate electricity for powering the LED.

8. The rotary aircraft according to claim 7, wherein the light module further comprises:

a filtering element to filter and store the electricity generated by the voltage source; and a control circuit configured to supply the electricity from the filtering element to the LED in accordance with predefined conditions being in effect.

9. The rotary aircraft according to claim 8, wherein:

the LED comprises one or more of a strobe LED, a variable color LED and a pattern forming LED, and the control circuit is further configured to control operations of the one or more of the strobe LED, the variable color LED and the pattern forming LED in accordance with additional predefined conditions being in effect.

10. The rotary aircraft according to claim 7, wherein the voltage source comprises a piezoelectric element to generate electricity in response to the rotations of the tip about the rotational axis.

11. A tip of a blade body of an aerodynamic blade, the tip being rotatable about a rotational axis and comprising:

a light module configured to activate in response to rotations of the tip about the rotational axis to emit light visible at an exterior of the blade body;

inboard and outboard blade structures, the inboard blade structure having an outboard side adjacent to the light module;

a securing feature interposed between the light module and the outboard blade structure; and sheaths partially covering upper and lower surfaces of the inboard and outboard blade structures, the light module and the securing feature, the sheaths defining slots and the light module comprising lenses protruding through the slots.

12. The aerodynamic blade according to claim 11, wherein the light module comprises:

a light emitting diode (LED); and a voltage source to generate electricity for powering the LED.

13. The aerodynamic blade according to claim 12, wherein the light module further comprises:

a filtering element to filter and store the electricity generated by the voltage source; and a control circuit configured to supply the electricity from the filtering element to the LED in accordance with predefined conditions being in effect.

14. The aerodynamic blade according to claim 13, wherein:

the LED comprises one or more of a strobe LED, a variable color LED and a pattern forming LED, and the control circuit is further configured to control operations of the one or more of the strobe LED, the variable color LED and the pattern forming LED in accordance with additional predefined conditions being in effect.

15. The aerodynamic blade according to claim 12, wherein the voltage source comprises an external circuit or is localized in the light module.

16. The aerodynamic blade according to claim 12, wherein the voltage source comprises a piezoelectric element to generate electricity in response to the rotations of the tip about the rotational axis.

* * * * *